A. C. VAN DE VELDE.
HOIST.
APPLICATION FILED SEPT. 11, 1913.
1,119,901. Patented Dec. 8, 1914.
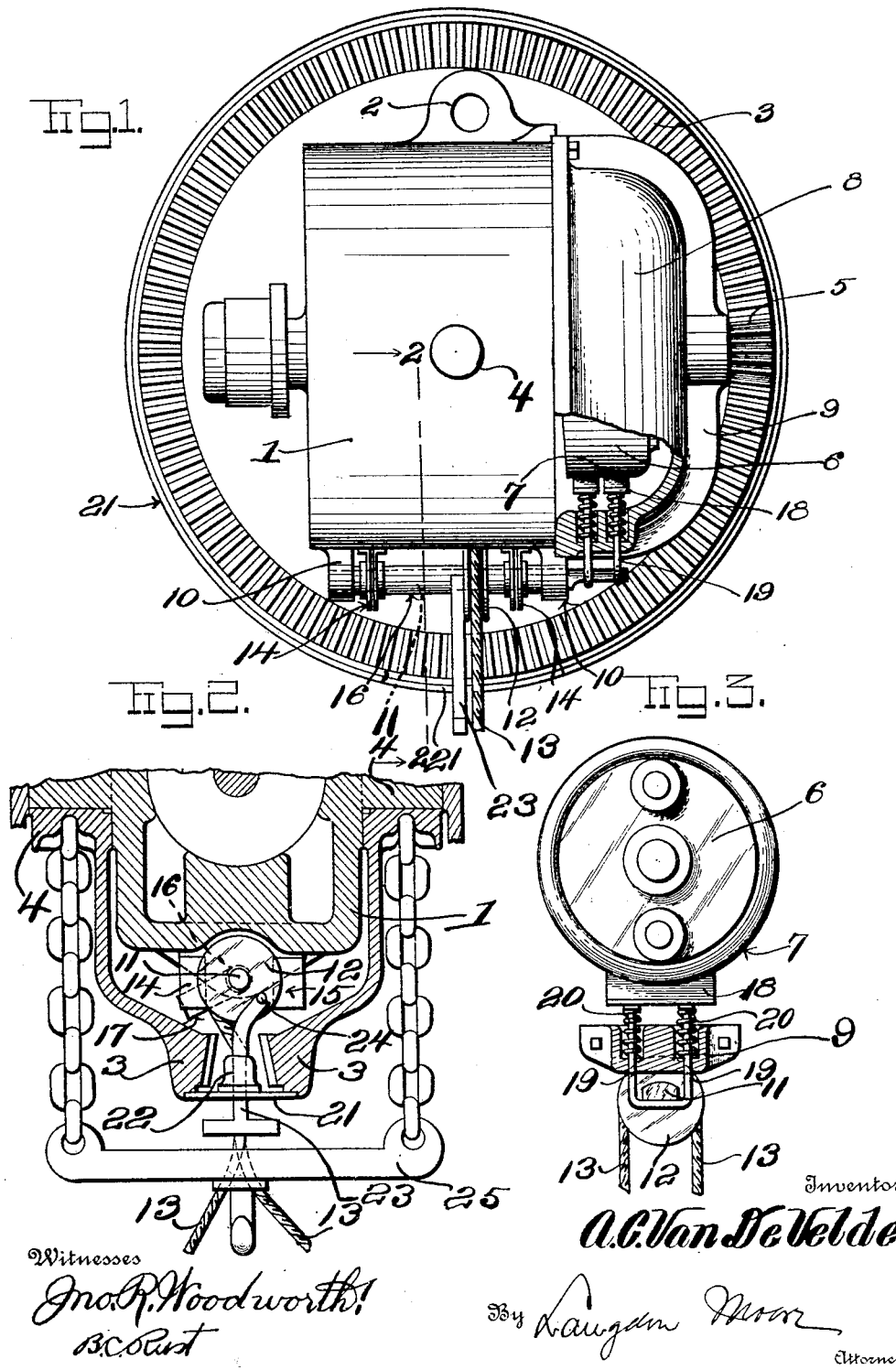
Inventor
A. C. Van De Velde,
By Langdon Moore
Attorney
Witnesses
Jno. R. Woodworth
B. C. Rust

UNITED STATES PATENT OFFICE.

ABRAHAM C. VAN DE VELDE, OF CHICAGO, ILLINOIS.

HOIST.

1,119,901.   Specification of Letters Patent.   Patented Dec. 8, 1914.

Original application filed February 29, 1912, Serial No. 680,771. Divided and this application filed September 11, 1913. Serial No. 789,309.

*To all whom it may concern:*

Be it known that I, ABRAHAM C. VAN DE VELDE, a citizen of the United States, residing at Chicago, in the county of Cook and State of Illinois, have invented new and useful Improvements in Hoists, of which the following is a specification.

This invention relates to improvements in power hoists, and more particularly to a brake and limit stop for the hoisting device.

It is the object of this invention to provide an electrically operated power hoist with a brake which is adapted to be automatically applied when the power is cut off and also with an automatic limit stop adapted to cut off the power and apply the brake when the load bar in hoisting a load reaches the upper limit of travel.

The advantages of applying the brake upon the cutting off of the power is obvious as well as the automatic application of the brake when the load reaches the hoisting limit.

While the preferred form of this invention is illustrated upon the accompanying sheet of drawing, yet it is to be understood that minor changes may be made without departing from the scope thereof.

Figure 1 is a view in side elevation of an electric hoist, with the near driving gear wheel removed and part of the gear casing cover broken away and in section. Fig. 2 is a view in transverse section taken on line 2—2 of Fig. 1. Fig. 3 is a detail view in end elevation.

As this automatic brake and limit stop was originally described in my prior application 680,771 of Feb. 29, 1912, of which this is a division, it will be described herein as applied to the hoist forming the subject of said prior application. However, it is to be understood that this device may be applied as well to other forms of electric hoists.

As illustrated in Fig. 1, the hoist comprises an electric motor carried in a casing 1 which is adapted to be suspended by the ring 2 to a traveling carriage or fixed support. The driving gear wheels 3 are mounted on outstanding bearings 4 on the motor casing 1. The train of gears from the motor to the driving pinion 5 are mounted in a gear casing 6, keyed, or by other means fastened, on the driving shaft of the motor, which is provided with an outer cylindrical brake engaging surface 7. A cover 8 for the gear casing is secured to the motor casing and is provided with a central vertical bracket which provides a bearing for the driving pinion 5 and a support for the brake. Upon the bottom of the motor casing 1 depending bearings 10 are provided for a shaft 11 extending parallel with the motor shaft and beyond one of the bearings under the bracket 9. Upon the shaft 11 intermediate the bearings therefor is secured a pulley wheel 12 over which passes a rope 13 with its ends hanging free on either side of the pulley wheel. Upon the bottom of the motor casing 1 on each side of the shaft 11 are arranged stationary jaw members 14 and 15 of an electric switch with the members of each pair on opposite sides of the pulley wheel 12. The respective pairs of jaws 14 and 15 are connected to the opposite brushes of the commutator of the motor. Upon a hollow shaft 16 mounted upon the shaft 11 and secured to the pulley wheel 12 are mounted a pair of movable contact members 17 connected to the source of electrical energy adapted to engage the jaws of each pair of stationary members. These movable contacts are so arranged as to be normally out of contact with either pair of jaws, but upon pulling on one end of the rope 13 they will be brought in contact with the jaws 14 connected with the commutator to rotate the driving shaft to hoist the load, and upon a pull on the other end of the rope to be rotated out of contact to a position again between both pairs of jaws, then upon a further pull upon the same end to engage in the jaws 15 of the other pair of jaws connected so as to operate the driving shaft to lower the load. Pulling on the other end of the rope 13 the contacts are again returned to the normal position.

A friction brake 18 engaging the gear casing surface 7 is provided to prevent rotation of the driving gear when the electric power is cut off. The brake is adapted to engage the under side of the gear casing, and is supported upon a pair of U-shaped pins having the shanks 19 passing through the bracket 9 and is held in contact with the casing by coil springs 20 about the shanks 19 between the bottom of the brake and top of the bracket. The shaft 11 extends between the shanks 19 under the bracket and over the middle joining portion and is cut away so that when the switch members are out of contact the brake will be applied, but when the contact is made in either direction by the rotation of the shaft, the shanks will be drawn downward and the brake released.

To prevent dust and dirt entering between the teeth on the driving gear a cover 21 is secured against rotation in grooves upon the outer edge of each gear 3. Upon the bottom of the cover 21 an aperture having a guide nipple 22 is provided for the passage of the rope 13. This guide also acts as a guide for a limit stop lever 23 so arranged as to engage a pin 24 on the pulley wheel 12 and rotate the pulley to throw the contact 17 out of connection when the lever is forced upward by contact with the load bar 25 in hoisting a load.

What I claim is:

1. In an electric power hoist, a suspended frame, a motor supported therein, a rotatable gear casing containing a train of gears connected thereto, a driving pinion operated by the train of gears, driving gears inclosing each side of the motor and gear casing having outstanding chain pulleys, a stationary cover between the adjacent edges of the driving gears, a rotatable shaft mounted between the motor and cover, a pulley wheel secured to the shaft, a rope passing over the pulley wheel, a guide nipple therefor carried upon the cover, stationary jaw members of electrical switches on each side of the shaft, movable contact members connected to a source of electricity secured to the shaft, an outstanding pin on the side of the pulley, a curved limit stop lever, a guide therefor upon the cover, said limit stop lever extending below the cover and adapted to be engaged by the load and moved upward through the guide, the end of the curved upper portion engaging the pin and rotating the pulley to break the circuit upon upward movement.

2. In an electric power hoist, a suspended frame, a motor supported therein, a rotatable gear casing containing a train of gears connected thereto, a driving pinion operated by the train of gears, driving gears inclosing each side of the motor and gear casing having outstanding chain pulleys, a stationary cover between the adjacent edges of the driving gears, a rotatable shaft mounted between the motor and cover, a pulley wheel secured to the shaft, a rope passing over the pulley wheel, a guide nipple therefor carried upon the cover, stationary jaw members of electrical switches on each side of the shaft, movable contact members connected to a source of electricity secured to the shaft, an outstanding pin on the side of the pulley, a curved limit stop lever, a guide therefor upon the cover, said limit stop lever extending below the cover and adapted to be engaged by the load and moved upward through the guide, the end of the curved upper portion engaging the pin and rotating the pulley to break the circuit upon upward movement, one end of the shaft extending under the gear casing and provided with a flat cut away portion, a spring pressed friction brake for engaging the gear casing supported upon U-shaped pins extending through a bracket therefor and passing about the flat portion of the shaft.

ABRAHAM C. VAN DE VELDE.

Witnesses:
   CHAS. L. THAYER,
   JOHN VIS.

Copies of this patent may be obtained for five cents each, by addressing the "Commissioner of Patents. Washington, D. C."